United States Patent
Robinson et al.

(10) Patent No.: US 10,621,647 B2
(45) Date of Patent: *Apr. 14, 2020

(54) METHOD FOR PROVIDING A CUSTOMIZED PRODUCT RECOMMENDATION

(71) Applicant: The Gillette Company LLC, Boston, MA (US)

(72) Inventors: Susan Clare Robinson, Windsor (GB); Paul Leslie Warrick, Reading (GB)

(73) Assignee: The Gillette Company LLC, Boston, MA (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/635,588

(22) Filed: Jun. 28, 2017

(65) Prior Publication Data

US 2018/0040054 A1 Feb. 8, 2018

Related U.S. Application Data

(60) Provisional application No. 62/372,009, filed on Aug. 8, 2016.

(51) Int. Cl.
*G06Q 30/00* (2012.01)
*G06Q 30/06* (2012.01)
*G06Q 30/02* (2012.01)
*A45D 44/00* (2006.01)

(52) U.S. Cl.
CPC ......... *G06Q 30/0631* (2013.01); *A45D 44/00* (2013.01); *G06Q 30/0203* (2013.01); *G06Q 30/0278* (2013.01); *G06Q 30/0621* (2013.01); *A45D 2044/007* (2013.01)

(58) Field of Classification Search
CPC .................................................. G06Q 30/06–08
USPC ................................................. 705/26.1–27.2
See application file for complete search history.

(56) References Cited

U.S. PATENT DOCUMENTS

| 6,189,215 B1 | 2/2001 | Beerwerth et al. |
| 8,615,886 B1 | 12/2013 | Childers |
| 8,650,953 B2 | 2/2014 | Cherian et al. |
| 9,126,346 B2 | 9/2015 | Meier et al. |
| 9,174,351 B2 | 11/2015 | Binder |
| 2008/0168657 A1 | 7/2008 | Cloke et al. |

(Continued)

OTHER PUBLICATIONS

U.S. Appl. No. 15/635,489, filed Jun. 28, 2017, Susan Clare Robinson Paul Leslie Warrick.

(Continued)

*Primary Examiner* — Ethan D Civan
(74) *Attorney, Agent, or Firm* — Kevin C. Johnson (57) ABSTRACT

Included is a method for providing a customized product recommendation to a user. Information is collected from a user regarding issues experienced by the user after cutting and/or removing hair selected from the group consisting of discomfort, dry skin, missed hairs, hair not cut close enough, nicks, cuts, trapped hairs, ingrown hairs, razor bumps, blemishes, acne, razor burn, irritation, redness, pseudofolliculitis barbae, and itching. The information collected from the user is analyzed. A product for the user is selected from at least two available products based upon the information collected from the user. The selected product is recommended to the user.

16 Claims, 11 Drawing Sheets

(56) References Cited

U.S. PATENT DOCUMENTS

| | | |
|---|---|---|
| 2013/0057866 A1* | 3/2013 | Hillebrand ............ A45D 44/005 |
| | | 356/421 |
| 2014/0137883 A1 | 5/2014 | Rothschild |
| 2015/0032508 A1 | 1/2015 | Lotlikar et al. |
| 2015/0183118 A1 | 7/2015 | Roth |
| 2015/0205279 A1 | 7/2015 | Simeth |
| 2015/0217465 A1* | 8/2015 | Krenik .................. B26B 19/388 |
| | | 700/90 |
| 2016/0167241 A1 | 6/2016 | Goldfarb et al. |

OTHER PUBLICATIONS

U.S. Appl. No. 15/635,503, filed Jun. 28, 2017, Susan Clare Robinson Paul Leslie Warrick.
U.S. Appl. No. 15/635,536, filed Jun, 28, 2017, Susan Clare Robinson Paul Leslie Warrick.
U.S. Appl. No. 15/635,562, filed Jun. 28, 2017, Susan Clare Robinson Paul Leslie Warrick.
U.S. Appl. No. 15/635,618, filed Jun. 28, 2017, Susan Clare Robinson Paul Leslie Warrick.
PCT International Search Report with Written Opinion in corresponding international application PCT/US2017/044623 dated Sep. 28, 2017.

* cited by examiner

METHOD FOR PROVIDING A CUSTOMIZED PRODUCT RECOMMENDATION

FIELD OF THE INVENTION

The present invention relates generally to systems and methods for providing customized product recommendations and specifically to systems and methods for providing customized hair cutting or hair removal product recommendations from information collected from a user.

BACKGROUND OF THE INVENTION

A wide variety of products are marketed for cutting and removing hair. Such products include products for cutting hair, products for removing hair, products to be applied by a user prior to cutting/removing hair and products to be applied by a user after cutting/removing hair. With such a wide variety of products to choose from and each for different purposes and/or benefits it is not uncommon for a user to have difficulty determining which product or combination of products such as a regimen should be used for their unique needs.

A variety of methods have been used in other industries such as the cosmetics industry to provide customized product recommendations to users. For example, some methods use a feature-based analysis in which one or more features of a skin condition (e.g., fine lines, wrinkles, spots, uneven skin tone) are detected in a captured image (e.g., a digital photo) by looking for features that meet a definition are commonly used. However, such systems have not addressed the needs for hair cutting/removal.

Accordingly, there remains a need to provide a customized product recommendation to a user that is customized to the individual user's hair cutting or hair removal needs.

A method for providing a customized product recommendation to a user is provided. Information is collected from a user regarding issues experienced by the user after cutting and/or removing hair selected from the group consisting of discomfort, dry skin, missed hairs, hair not cut close enough, nicks, cuts, trapped hairs, ingrown hairs, razor bumps, blemishes, acne, razor burn, irritation, redness, pseudofolliculitis barbae and itching. The collected information is analyzed. A product is selected for the user from at least two available products based upon information collected and analyzed from the user. The selected product is recommended to the user.

Additionally, information is collected from a user regarding an area of the body where the user cuts and/or removes hair. The areas of the body comprise a user's cheek, a user's neck, a user's head, a user's groin, a user's underarm, a user's chest, a user's back, a user's leg, a user's arm, and a user's bikini area.

The product comprises products to use for cutting hair, products for removing hair, products to be applied by a user prior to cutting and/or removing hair and products to be applied by a user after cutting and/or removing hair.

Products for cutting hair comprise a multi-blade razor, a single blade razor, a straight razor, a disposable razor, a dry shaver, and a trimmer.

Products for removing hair comprise a wax, a light-based device, a laser based device, an epilator, a depilatory cream, and an abrasive pad.

Products to be applied by the user prior to cutting and/or removing hair comprise a shave cream, a shave soap, a shave oil, a shave prep, a shave foam, a shave gel and an analgesic.

Products to be applied by the user after cutting and/or removing hair comprise an after-shave lotion, an after-shave balm, an after-shave gel, an oil, a serum and/or a moisturizer. Products to be applied by the user after cutting or removing hair comprise benzoyl peroxide, salicylic acid, azelaic acid, clindamycin, doxycycline, erythromycin, tetracycline, tretinoin, adapalene, taiarotene, fluocinolone acetonide, hydroquinone, fluocinolone, and alcohol containing products.

The information may be collected using a computing device. The computing device may comprise a mobile device, a tablet, a handheld device, and a desktop device.

The information may comprise voice information, pictorial information, video information, written questionnaire, and digital information.

The method may comprise the additional step of collecting information on the frequency the user experiences the issues after cutting and/or removing hair.

The method may comprise the additional step of collecting information as to which issues experienced after cutting and/or removing hair are troublesome for the user.

The method may comprise the additional step of collecting information on the degree a user experiences the issues after cutting and/or removing hair.

The method may comprise the additional step of collecting information as to which issues experienced after cutting and/or removing hair are a priority for the user to address.

The product selected may comprise a regimen of two or more products.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate various embodiments described herein, and together with the description serve to explain the principles and operations of the claimed subject matter.

DETAILED DESCRIPTION OF THE INVENTION

Figure 1:
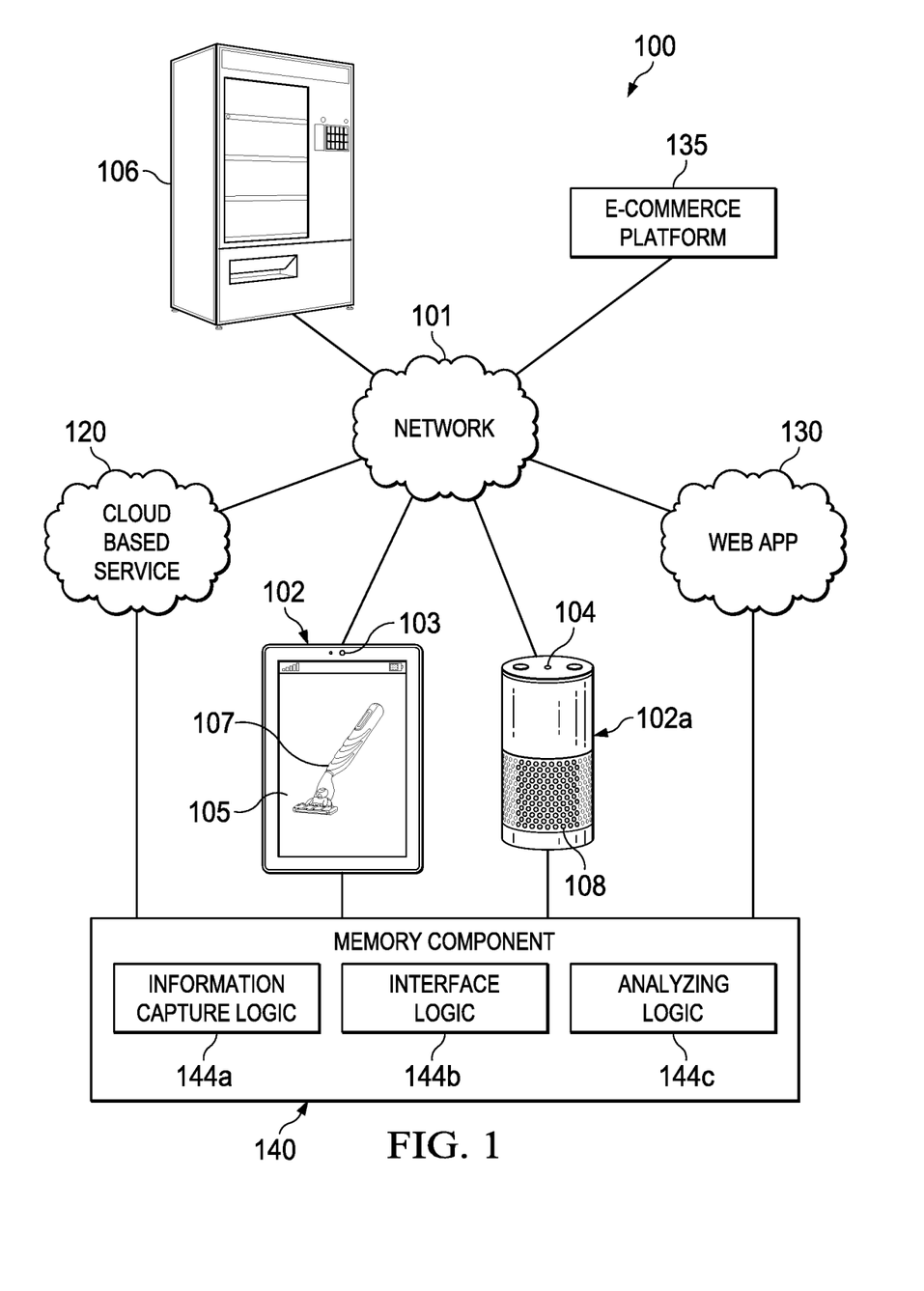
FIG. 1 depicts a computing environment for providing customized product recommendations, according to embodiments described herein.

FIG. 1 depicts a system 100 for collecting information from a user, analyzing the information, and providing a customized product recommendation. The system 100 may include a network 101, which may be embodied as a wide area network (such as a mobile telephone network, a public switched telephone network, a satellite network, the internet, etc.), a local area network (such as wireless-fidelity, Wi-Max, ZigBee™, Bluetooth™, etc.), and/or other forms of networking capabilities. Coupled to the network 101 are a computing device 102, 102a a kiosk computing device 106, a cloud based service 120, a web app 130 and/or an e-commerce platform 135.

The computing device 102, 102a may be a mobile device, a handheld device, a mobile telephone, a tablet, a laptop, a personal digital assistant, a desktop device, a desktop computer and/or other computing device configured for collecting, capturing, storing, and/or transferring information such as voice information, pictorial information, video information, written questionnaire and/or digital information such as a digital photograph. Accordingly, the computing device 102 may comprise an image capture device 103 such as a digital camera and/or may be configured to receive images from other devices. The computing device 102 may comprise an image display screen 105 to display an image of a product such as a multi-blade razor 107. The mobile computing device 102a may comprise a voice capture device 104 such as an audio recorder and/or may be configured to receive audio input from other devices. The computing device 102a may comprise a speaker 108 to provide audio information to a user. The computing device 102, 102a may include a memory component 140, which stores information capture logic 144a, interface logic 144b, and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or another computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring, and/or performing other functions on collected information from a user for selecting a product to be recommended to a user. The mobile computing device 102, 102a may also be configured for communicating with other computing devices via the network 101. The devices may also be linked to an e-commerce platform 135 to enable the user to purchase the product(s) being recommended.

The system 100 may also comprise a kiosk computing device 106, as illustrated in FIG. 1. The kiosk computing device 106 may operate similar to the computing device 102, 102a but may also be able to dispense one or more products and/or receive payment in the form of cash or electronic transactions.

It should be understood that while the kiosk computing device 106 is depicted as a vending machine type of device, this is merely an example. Some embodiments may utilize a mobile device that also provides payment and/or production dispensing. Consequently, the hardware and software depicted for the computing device 102, 102a may be included in the kiosk computing device 106 and/or other devices.

The system 100 may also comprise a cloud based service 120. The cloud based service 120 may include a memory component 140, which stores information capture logic 144a, interface logic 144b, and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or another computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring, and/or performing other functions on collected information from a user for selecting a product to be recommended to a user.

The system 100 may also comprise a web app 130. The web app 130 may include a memory component 140, which stores information capture logic 144a, interface logic 144b, and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or another computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring, and/or performing other functions on collected information from a user for selecting a product to be recommended to a user.

Figure 2:
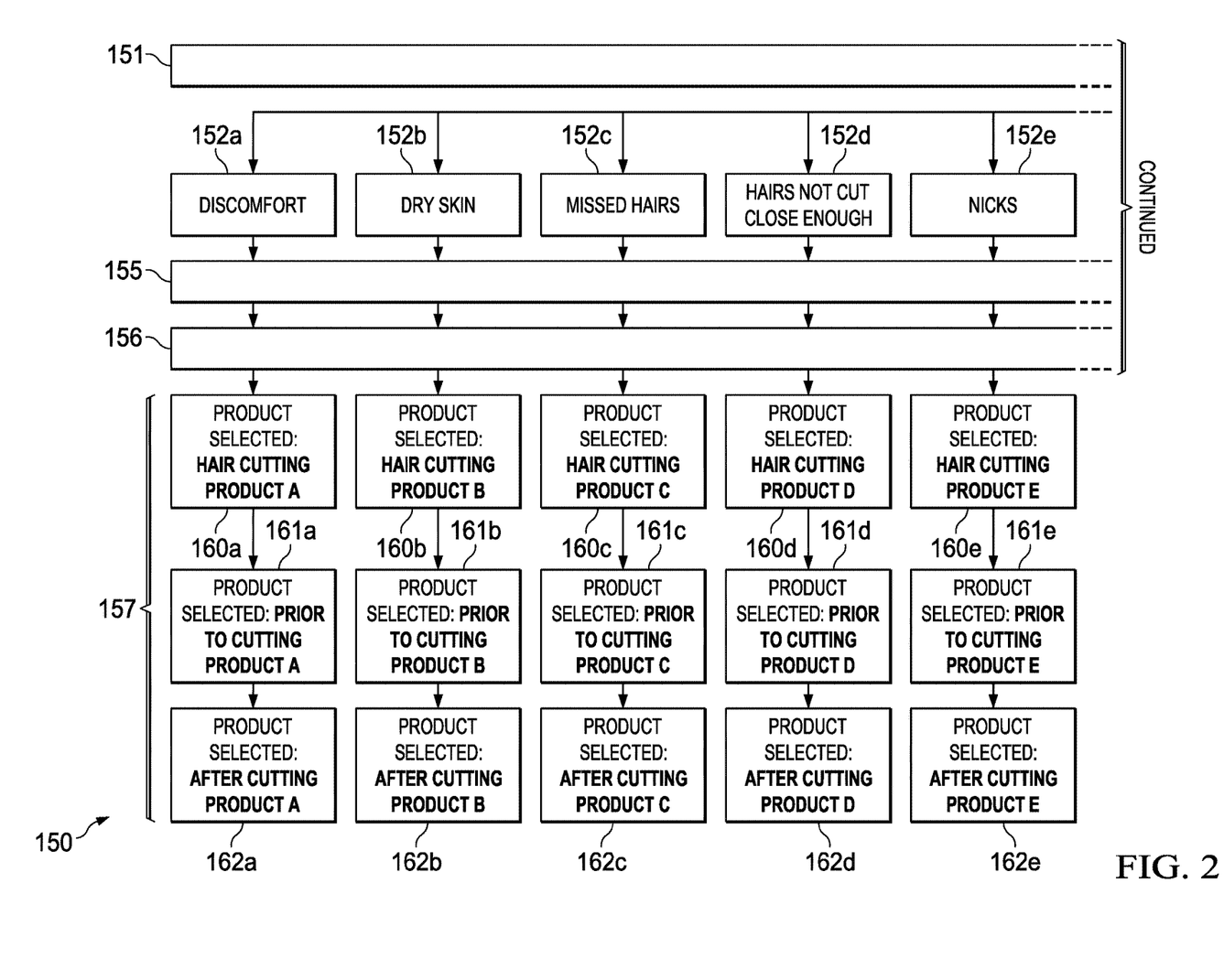
FIG. 2 depicts a flow chart of a method for providing a customized product recommendation to a user.

Referring now to FIG. 2 a flow chart 150 is shown. Flow chart 150 includes a method for providing a customized product recommendation to a user. At 151 a question is presented to the user regarding issues experienced by the user after cutting hair. Several inputs/choices for the issues a user experiences after cutting hair are provided at 152a-152p. The issues a user experiences after cutting hair are selected from the group consisting of discomfort 152a, dry skin 152b, missed hairs 152c, hair not cut close enough 152d, nicks 152e, cuts 152f, trapped hairs 152g, ingrown hairs 152h, razor bumps 152i, blemishes 152j, acne 152k, razor burn 152l, irritation 152m, redness 152n, pseudofolliculitis barbae 152o and itching 152p. Shaving refers to the act of cutting hair. The information from a user regarding the issues experienced after cutting hair is collected at 155. The collected information 155 is then analyzed at 156. Based on the collected and analyzed information 155, 156, a product is selected at 157 for the user. The product selection 157 is performed from at least two available products.

Product selection 157 of a product may comprise one or more selections of different types of products. Product selection may comprise selection of a product to use for cutting hair 160a-160p. If a user selects discomfort 152a as the issue, hair cutting product A is selected 160a. If a user selects dry skin 152b as the issue, hair cutting product B is selected 160b. If a user selects missed hairs 152c as the issue, hair cutting product C is selected 160c. If a user selects hairs not cut close enough 152d as the issue, hair cutting product D is selected 160d. If a user selects nicks 152*e* as the issue, hair cutting product E is selected 160*e*. If a user selects cuts 152*f* as the issue, hair cutting product F is selected 160*f*. If a user selects trapped hairs 152*g* as the issue, hair cutting product G is selected 160*g*. If a user selects ingrown hairs 152*h* as the issue, hair cutting product H is selected 160*h*. If a user selects razor bumps 152*i* as the issue, hair cutting product I is selected 160*i*. If a user selects blemishes 152*j* as the issue, hair cutting product J is selected 160*j*. If a user selects acne 152*k* as the issue, hair cutting product K is selected 160*k*. If a user selects razor burn 152*l* as the issue, hair cutting product L is selected 160*l*. If a user selects irritation 152*m* as the issue, hair cutting product M is selected 160*m*. If a user selects redness 152*n* as the issue, hair cutting product N is selected 160*n*. If a user selects pseudofolliculitis barbae 152*o* as the issue, hair cutting product O is selected 160*o*. If a user selects itching 152*p* as the issue, hair cutting product P is selected 160*p*.

Product selection may comprise the selection of a product to be applied by a user prior to hair cutting 161*a*-161*p*. If a user selects discomfort 152*a* as the issue, prior to hair cutting product A is selected 161*a*. If a user selects dry skin 152*b* as the issue, prior to hair cutting product B is selected 161*b*. If a user selects missed hairs 152*c* as the issue, prior to hair cutting product C is selected 161*c*. If a user selects hairs not cut close enough 152*d* as the issue, prior to hair cutting product D is selected 161*d*. If a user selects nicks 152*e* as the issue, prior to hair cutting product E is selected 161*e*. If a user selects cuts 152*f* as the issue, prior to hair cutting product F is selected 161*f*. If a user selects trapped hairs 152*g* as the issue, prior to hair cutting product G is selected 161*g*. If a user selects ingrown hairs 152*h* as the issue, prior to hair cutting product H is selected 161*h*. If a user selects razor bumps 152*i* as the issue, prior to hair cutting product I is selected 161*i*. If a user selects blemishes 152*j* as the issue, prior to hair cutting product J is selected 161*j*. If a user selects acne 152*k* as the issue, prior to hair cutting product K is selected 161*k*. If a user selects razor burn 152*l* as the issue, prior to hair cutting product L is selected 161*l*. If a user selects irritation 152*m* as the issue, prior to hair cutting product M is selected 161*m*. If a user selects redness 152*n* as the issue, prior to hair cutting product N is selected 161*n*. If a user selects pseudofolliculitis barbae 152*o* as the issue, prior to hair cutting product O is selected 161*o*. If a user selects itching 152*p* as the issue prior to hair cutting product P is selected 161*p*.

Product selection may comprise the selection of a product to be applied by a user after hair cutting 162*a*-162*p*. If a user selects discomfort 152*a* as the issue, after hair cutting product A is selected 162*a*. If a user selects dry skin 152*b* as the issue, after hair cutting product B is selected 162*b*. If a user selects missed hairs 152*c* as the issue, after hair cutting product C is selected 162*c*. If a user selects hairs not cut close enough 152*d* as the issue, after hair cutting product D is selected 162*d*. If a user selects nicks 152*e* as the issue, after hair cutting product E is selected 162*e*. If a user selects cuts 152*f* as the issue, after hair cutting product F is selected 162*f*. If a user selects trapped hairs 152*g* as the issue, after hair cutting product G is selected 162*g*. If a user selects ingrown hairs 152*h* as the issue, after hair cutting product H is selected 162*h*. If a user selects razor bumps 152*i* as the issue, after hair cutting product I is selected 162*i*. If a user selects blemishes 152*j* as the issue, after hair cutting product J is selected 162*j*. If a user selects acne 152*k* as the issue, after hair cutting product K is selected 162*k*. If a user selects razor burn 152*l* as the issue, after hair cutting product L is selected 162*l*. If a user selects irritation 152*m* as the issue, after hair cutting product M is selected 162*m*. If a user selects redness 152*n* as the issue, after hair cutting product N is selected 162*n*. If a user selects pseudofolliculitis barbae 152*o* as the issue, after hair cutting product O is selected 162*o*. If a user selects itching 152*p* as the issue, after hair cutting product P is selected 162*p*.

The product selection may comprise a regimen of two or more products. For example, the product selection may be a regimen comprising a product to use for cutting hair 160*a* and a product to be applied by a user prior to cutting hair 161*a*. The product selection may be a regimen comprising a product to use for cutting hair 160*b*, a product to be applied by a user prior to cutting hair 161*b* and a product to be applied by a user after cutting hair 162*b*. Other combinations are possible from the choices shown.

After the product has been selected, the selected product is recommended to the user at 163.

Figure 3:
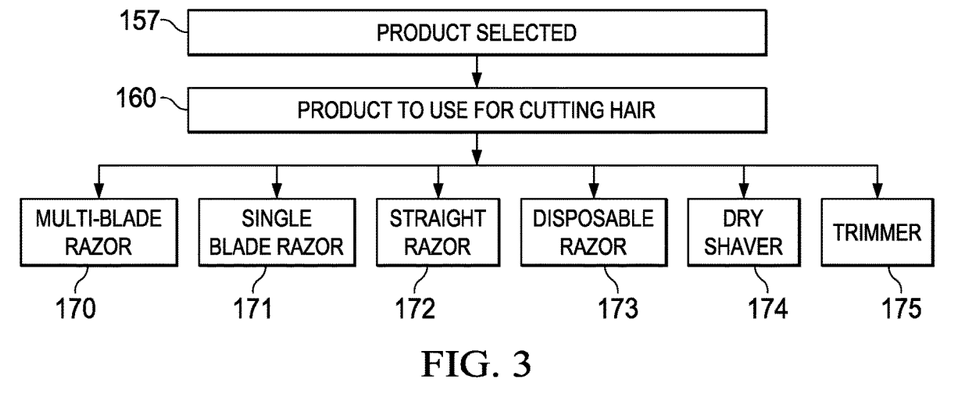
FIG. 3 depicts a chart showing products to be selected from for cutting hair.

Referring now to FIG. 3, there is shown product selection 157 of a product to use for cutting hair 160. Products to be used for cutting hair comprise a multi-blade razor 170, a single blade razor 171, a straight razor 172, a disposable razor 173, a dry shaver 174, and a trimmer 175.

Figure 4:
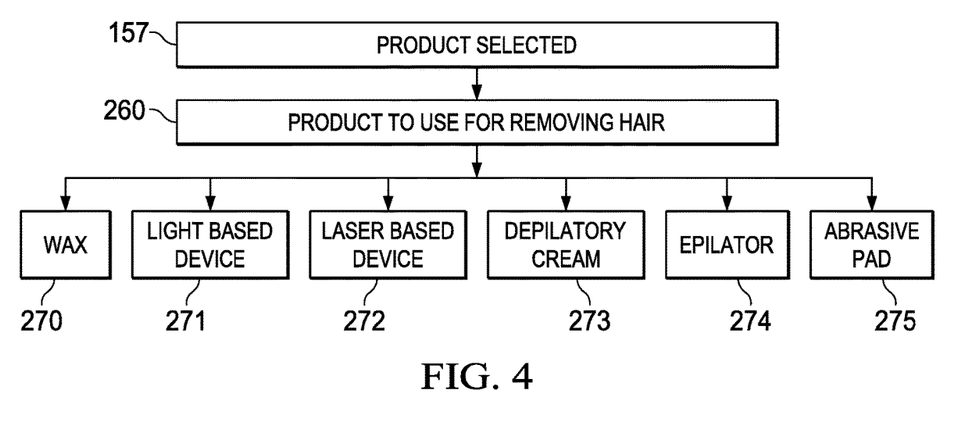
FIG. 4 depicts a chart showing products to be selected from for removal of hair.

Referring now to FIG. 4, there is a shown product selection 157 of a product to use for removal of hair 260. Products to be used for removal of hair comprise a wax 270, a light-based device 271, a laser based device 272, a depilatory cream 273, an epilator 274, and an abrasive pad 275.

Figure 5:
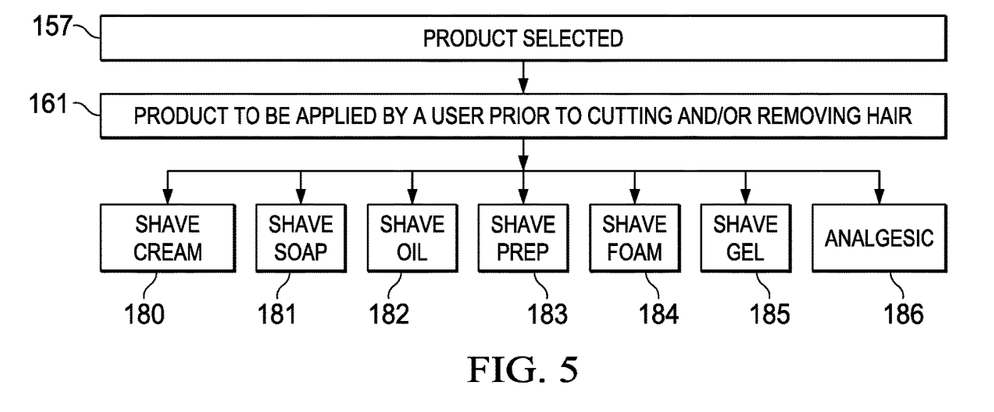
FIG. 5 depicts a chart showing products to be selected from to be applied by a user prior to cutting and/or removing hair.

Referring now to FIG. 5, there is shown another product selection 157 of a product to be applied by a user prior to hair cutting and/or removal 161. Products to be applied by a user prior to hair cutting and/or removal comprise a shave cream 180, shave soap 181, a shave oil 182, a shave prep 183, a shave foam 184, a shave gel 185, and an analgesic 186.

Figure 6:
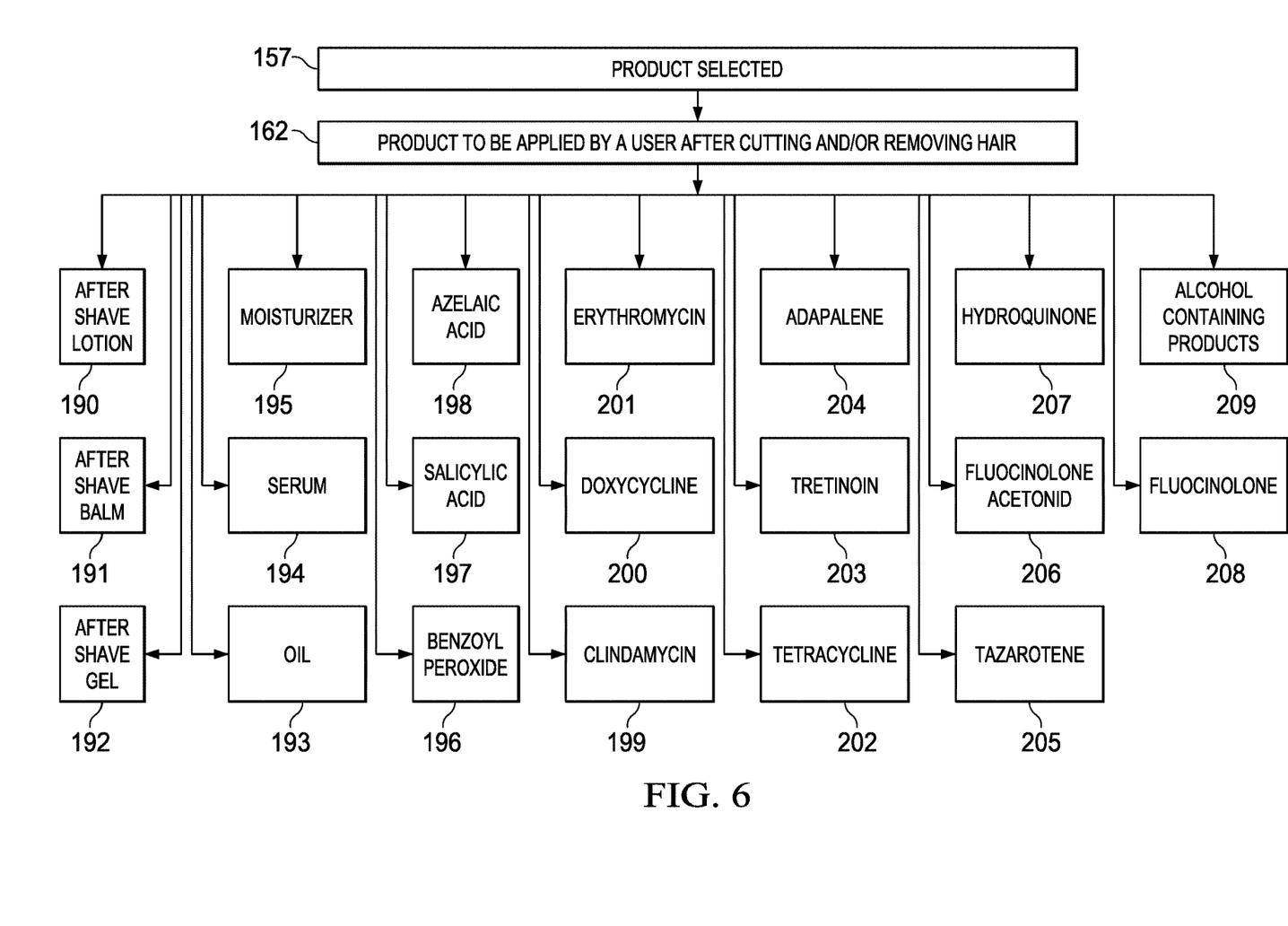
FIG. 6 depicts a chart showing products to be selected from to be applied by a user after cutting and/or removing hair.

Referring now to FIG. 6, there is shown another product selection 157 of a product to be applied by a user after hair cutting and/or removal 162. Products to be applied by a user after hair cutting and/or removal comprise an after-shave lotion 190, an after-shave balm 191, an after-shave gel 192, an oil 193, a serum 194, a moisturizer 195, benzoyl peroxide 196, salicylic acid 197, azelaic acid 198, clindamycin 199, doxycycline 200, erythromycin 201, tetracycline 202, tretinoin 203, adapalene 204, tazarotene 205, fluocinolone acetonide 206, hydroquinone 207, fluocinolone 208 and alcohol containing products 209.

Figure 7:
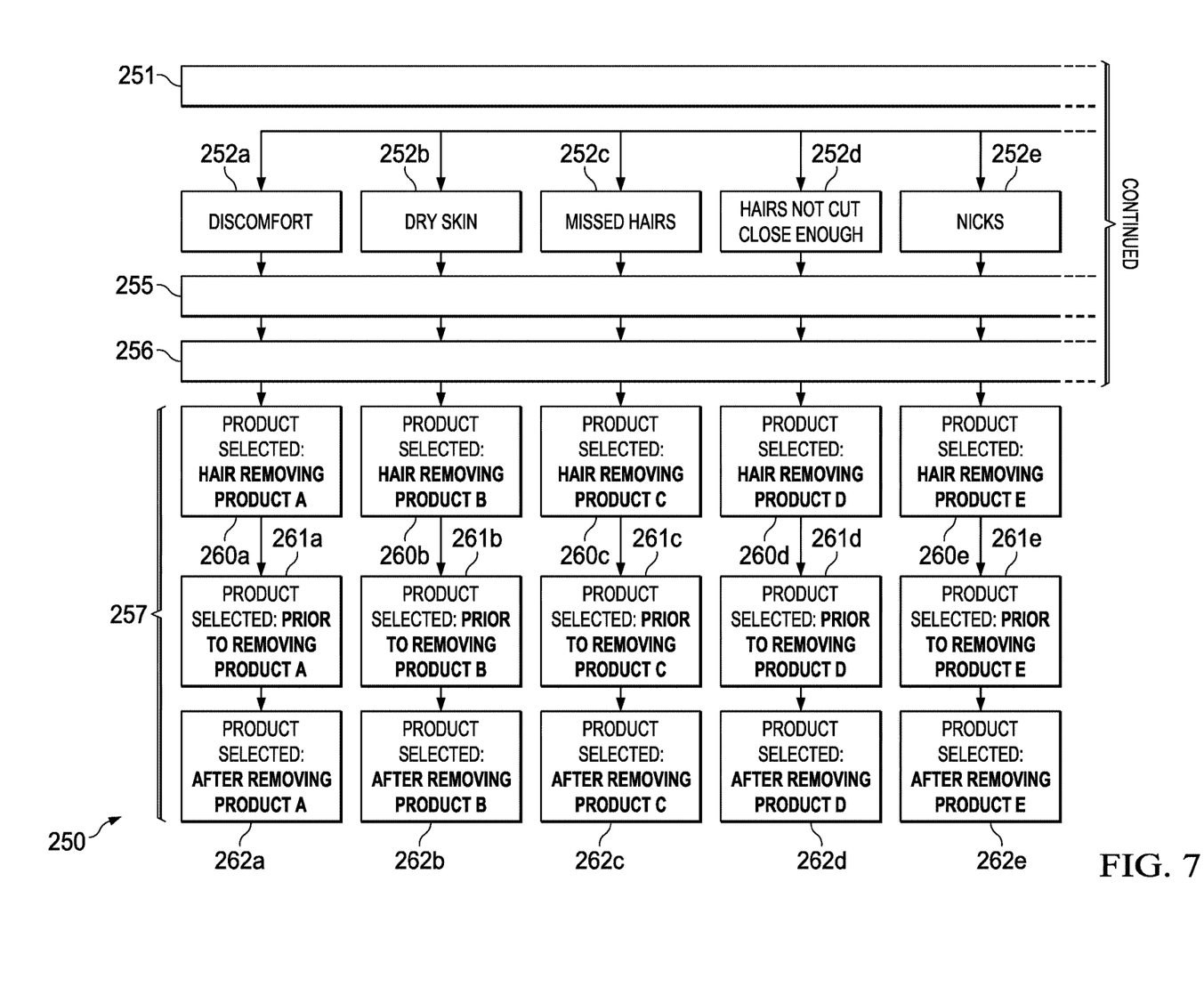
FIG. 7 depicts a flow chart of another method for providing a customized product recommendation to a user.

Referring now to FIG. 7 a flow chart 250 is shown. Flow chart 250 includes a method for providing a customized product recommendation to a user. At 251 a question is presented to the user regarding the issues experienced by a user after hair removal. Question 251 may be asked on its own or in addition to question 151 from FIG. 2. Several inputs/choices for the issues experienced by the user after hair removal are provided at 252*a*-252*p*. The issues a user experiences after removing hair are selected from the group consisting of discomfort 252*a*, dry skin 252*b*, missed hairs 252*c*, hair not cut close enough 252*d*, nicks 252*e*, cuts 252*f*, trapped hairs 252*g*, ingrown hairs 252*h*, razor bumps 252*i*, blemishes 252*j*, acne 252*k*, razor burn 252*l*, irritation 252*m*, redness 252*n*, pseudofolliculitis barbae 252*o* and itching 252*p*. Shaving refers to the act of cutting hair. The information from a user regarding the issues experienced after removing hair is collected at 255. The collected information 255 is then analyzed at 256. Based on the collected and analyzed information 255 and 256 a product is selected at 257 for the user. The product selection 257 is performed from at least two available products.

Product selection 257 of a product may comprise one or more selections of different types of products. Product selection may comprise selection of a product to use for removing hair 260a-260p. If a user selects discomfort 252a as the issue, hair removing product A is selected 260a. If a user selects dry skin 252b as the issue, hair removing product B is selected 260b. If a user selects missed hairs 252c as the issue, hair removing product C is selected 260c. If a user selects hairs not cut close enough 252d as the issue, hair removing product D is selected 260d. If a user selects nicks 252e as the issue, hair removing product E is selected 260e. If a user selects cuts 252f as the issue, hair removing product F is selected 260f. If a user selects trapped hairs 252g as the issue, hair removing product G is selected 260g. If a user selects ingrown hairs 252h as the issue, hair removing product H is selected 260h. If a user selects razor bumps 252i as the issue, hair removing product I is selected 260i. If a user selects blemishes 252j as the issue, hair removing product J is selected 260j. If a user selects acne 252k as the issue, hair removing product K is selected 260k. If a user selects razor burn 252l as the issue, hair removing product L is selected 260l. If a user selects irritation 252m as the issue, hair removing product M is selected 260m. If a user selects redness 252n as the issue, hair removing product N is selected 260n. If a user selects pseudofolliculitis barbae 252o as the issue, hair removing product O is selected 260o. If a user selects itching 252p as the issue, hair removing product P is selected 260p.

Product selection may comprise the selection of a product to be applied by a user prior to hair removing 261a-261p. If a user selects discomfort 252a as the issue, prior to hair removing product A is selected 261a. If a user selects dry skin 252b as the issue, prior to hair removing product B is selected 261b. If a user selects missed hairs 252c as the issue, prior to hair removing product C is selected 261c. If a user selects hairs not cut close enough 252d as the issue, prior to hair removing product D is selected 261d. If a user selects nicks 252e as the issue, prior to hair removing product E is selected 261e. If a user selects cuts 252f as the issue, prior to hair removing product F is selected 261f. If a user selects trapped hairs 252g as the issue, prior to hair removing product G is selected 261g. If a user selects ingrown hairs 252h as the issue, prior to hair removing product H is selected 261h. If a user selects razor bumps 252i as the issue, prior to hair removing product I is selected 261i. If a user selects blemishes 252j as the issue, prior to hair removing product J is selected 261j. If a user selects acne 252k as the issue, prior to hair removing product K is selected 261k. If a user selects razor burn 252l as the issue, prior to hair removing product L is selected 261l. If a user selects irritation 252m as the issue, prior to hair removing product M is selected 261m. If a user selects redness 252n as the issue, prior to hair removing product N is selected 261n. If a user selects pseudofolliculitis barbae 252o as the issue, prior to hair removing product O is selected 261o. If a user selects itching 252p as the issue prior to hair removing product P is selected 261p.

Product selection may comprise selection of a product to be applied by a user after hair removing 262a-262p. If a user selects discomfort 252a as the issue, after hair removing product A is selected 262a. If a user selects dry skin 252b as the issue, after hair removing product B is selected 262b. If a user selects missed hairs 252c as the issue, after hair removing product C is selected 262c. If a user selects hairs not cut close enough 252d as the issue, after hair removing product D is selected 262d. If a user selects nicks 252e as the issue, after hair removing product E is selected 262e. If a user selects cuts 252f as the issue, after hair removing product F is selected 262f. If a user selects trapped hairs 252g as the issue, after hair removing product G is selected 262g. If a user selects ingrown hairs 252h as the issue, after hair removing product H is selected 262h. If a user selects razor bumps 252i as the issue, after hair removing product I is selected 262i. If a user selects blemishes 252j as the issue, after hair removing product J is selected 262j. If a user selects acne 252k as the issue, after hair removing product K is selected 262k. If a user selects razor burn 252l as the issue, after hair removing product L is selected 262l. If a user selects irritation 252m as the issue, after hair removing product M is selected 262m. If a user selects redness 252n as the issue, after hair removing product N is selected 262n. If a user selects pseudofolliculitis barbae 252o as the issue, after hair removing product O is selected 262o. If a user selects itching 252p as the issue, after hair removing product P is selected 262p.

The product selection may comprise a regimen of two or more products. For example, the product selection may be a regimen comprising a product to use for removing hair 260a and a product to be applied by a user prior to removing hair 261a. The product selection may be a regimen comprising a product to use for removing hair 260b, a product to be applied by a user prior to removing hair 261b and a product to be applied by a user after removing hair 262b. Other combinations are possible from the choices shown.

After the product has been selected, the selected product is recommended to the user at 263.

Figure 8:
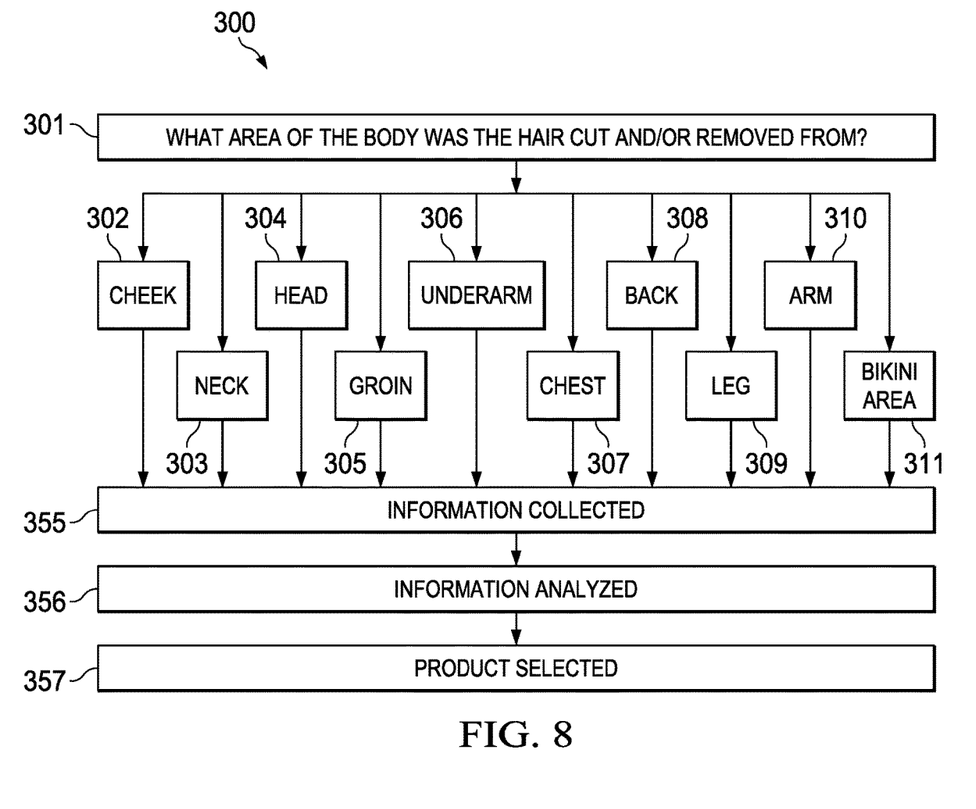
FIG. 8 depicts a flow chart of another method for providing a customized product recommendation to a user to be used in conjunction with the methods shown in FIGS. 2-7.

Referring now to FIG. 8 a flow chart 300 is shown. Flow chart 300 includes a method for providing a customized product recommendation to a user. At 301 a question is presented to the user regarding an area of the body where the hair cutting and/or removing occurs. Question 301 would come after or in addition to questions 151 and 251 regarding the issues experienced after hair cutting and/or removing shown in FIGS. 2 and 6. Several inputs/choices for the area of the body where the hair cutting and/or removing is taken are provided at 302-311. The inputs/choices include a user's cheek 302, a user's neck 303, user's head 304, a user's groin 305, a user's underarm 306, a user's chest 307, a user's back 308, a user's leg 309, a user's arm 310, and a user's bikini area 311. The information from a user regarding the area of the body where the hair cutting and/or removing occurs is collected at 355. The collected information 355 is then analyzed at 356. Based on the collected and analyzed information 355 and 356, a product is selected at 357 for the user. The product selection 357 is performed on at least two available products. The steps of collecting information 355, analyzing the information 356 and selecting product are similar if not identical to those set forth above in FIGS. 2-7. The selected product is recommended to the user at 363.

Figure 9:
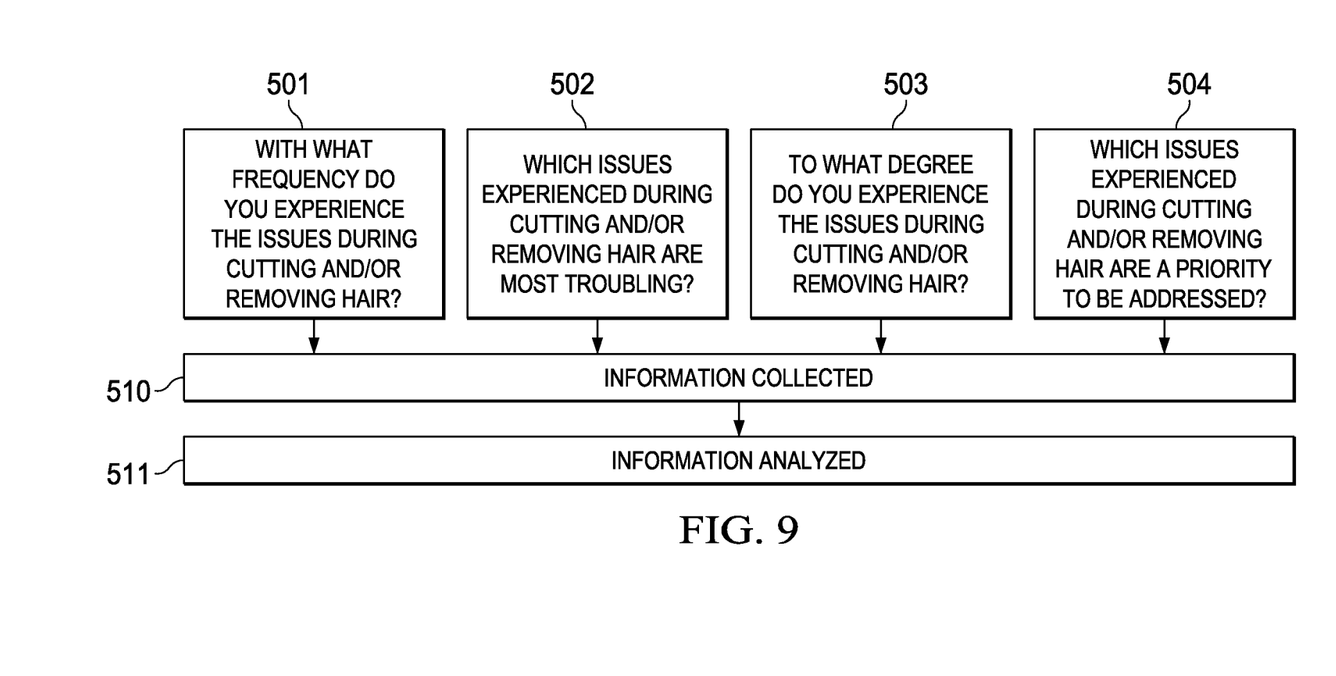
FIG. 9 depicts a chart with a series of questions for the user.

Referring to FIG. 9 there is shown additional questions that may be asked of the user about the hair cutting and/or hair removing experience. At 501 a question is presented addressing the frequency the user experiences the issues after cutting and/or removing hair. At 502 a question is presented as to which issues experienced after cutting and/or removing hair are most troubling for the user. At 503 a question is presented as to what degree does the user experience the issues after cutting and/or removing hair. At 504 a question is presented as to which issues experienced after cutting and/or removing hair are a priority to be addressed by the user. The information is collected at 510. The collected information is then analyzed 511. The analyzed information may be used in conjunction with the methods set forth above in FIGS. 2-8.

Combinations

Examples are:
A. A method for providing a customized product recommendation to a user comprising the steps of:
  a. collecting information from a user regarding issues experienced by the user after cutting and/or removing hair selected from the group consisting of discomfort, dry skin, missed hairs, hair not cut close enough, nicks, cuts, trapped hairs, ingrown hairs, razor bumps, blemishes, acne, razor burn, irritation, redness, pseudofolliculitis barbae and itching;
  b. analyzing the collected information,
  c. selecting a product for the user from at least two available products based upon information collected and analyzed from the user; and
  d. recommending the selected product to the user.
B. The method of paragraph A, further comprising the step of:
  e. collecting information from the user regarding an area of the body where the user cuts and/or removes hair.
C. The method of Paragraph B, wherein the area of the body comprises a user's cheek.
D. The method of Paragraph B, wherein the area of the body comprises a user's neck.
E. The method of Paragraph B, wherein the area of the body comprises a user's head, a user's groin, a user's underarm, a user's chest, a user's back, a user's leg, a user's arm and a user's bikini area.
F. The method of any preceding paragraph, wherein the products comprise a product for cutting hair, a product for removing hair, a product to be applied by the user prior to cutting and/or removing hair and/or a product to be applied by the user after cutting and/or removing hair.
G. The method of Paragraph F, wherein the products for cutting hair comprise a multi-blade razor, a single blade razor, a straight razor, a disposable razor, a dry shaver and a trimmer.
H. The method of Paragraph F, wherein the products for removing hair comprise a wax, a light-based device, a laser based device, a depilatory cream, an epilator, and an abrasive pad.
I. The method of Paragraph A, wherein the products to be applied by a user prior to cutting and/or removing hair comprise a shave cream, a shave soap, a shave oil, a shave prep, a shave foam, a shave gel and an analgesic.
J. The method of Paragraph F, wherein the products to be applied by the user after cutting and/or removing hair comprise an after-shave lotion, an after-shave balm, an after-shave gel, an oil, a serum and a moisturizer.
K. The method of Paragraph F, wherein the products to be applied by the user after cutting and/or removing hair comprise benzoyl peroxide, salicylic acid, azelaic acid, clindamycin, doxycycline, erythromycin, tetracycline, tretinoin, adapalene, tazarotene, fluocinolone acetonide, hydroquinone, fluocinolone and alcohol containing products.
L. The method of any preceding paragraph, wherein the information is collected using a computing device.
M. The method of Paragraph L, wherein the computing device comprises a mobile device, a tablet, a handheld device, and a desktop device.
N. The method of any preceding paragraph, wherein the information comprises voice information, pictorial information, video information, written questionnaire, and digital information.
O. The method of any preceding paragraph, further comprising the step of:
  f. collecting information on the frequency the user experiences the issues of step a).
P. The method of any preceding paragraph, further comprising the step of:
  g. collecting information as to which issues experienced in step a) are troublesome for the user.
Q. The method of any preceding paragraph, further comprising the step of:
  h. collecting information on the degree a user experiences the issues of step a).
R. The method of any preceding paragraph, further comprising the step of:
  i. collecting information as to which issues experienced in step a) are a priority for the user to address.
S. The method of any preceding paragraph, wherein the product selected comprises a regimen of two or more products.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital imaging method of analyzing digital images for providing a customized product recommendation to a user, the digital imaging method comprising the steps of:
  a. collecting by a digital camera digital images from a user regarding issues experienced by the user after shaving;
  b. transmitting the digital images from the digital camera to a computing device;
  c. analyzing by an analyzing logic in the computing device the digital images from the digital camera to determine issues experienced by the user after shaving selected from the group consisting of dry skin, missed hairs, nicks, cuts, trapped hairs, ingrown hairs, razor bumps, blemishes, acne, redness, and pseudofolliculitis barbae and an area of the body where the issue is experienced;

d. selecting by the analyzing logic in the computing device a product for the user from at least two available products based upon the issues experienced by the user after shaving and the area on the body where the issue is experienced; and e. recommending by an interface logic in the computing device the selected product to the user.

2. The method of claim 1, wherein the area of the body comprises a user's cheek.

3. The method of claim 1, wherein the area of the body comprises a user's neck.

4. The method of claim 1, wherein the area of the body comprises a user's head, a user's groin, a user's underarm, a user's chest, a user's back, a user's leg, a user's arm and a user's bikini area.

5. The method of claim 1 wherein the products comprise a product for cutting hair, a product for removing hair, a product to be applied by the user prior to cutting and/or removing hair and a product to be applied by the user after cutting and/or removing hair.

6. The method of claim 5, wherein the products for cutting hair comprise a multi-blade razor, a single blade razor, a straight razor, a disposable razor, a dry shaver and a trimmer.

7. The method of claim 5, wherein the products for removing hair comprise a wax, a light-based device, a laser based device, a depilatory cream, an epilator, and/or an abrasive pad.

8. The method of claim 5, wherein the products to be applied by a user prior to cutting and/or removing hair comprise a shave cream, a shave soap, a shave oil, a shave prep, a shave foam, a shave gel and an analgesic.

9. The method of claim 5, wherein the products to be applied by the user after cutting and/or removing hair comprise an after-shave lotion, an after-shave balm, an after-shave gel, an oil, a serum and a moisturizer.

10. The method of claim 5, wherein the products to be applied by the user after cutting and/or removing hair comprise benzoyl peroxide, salicylic acid, azelaic acid, clindamycin, doxycycline, erythromycin, tetracycline, tretinoin, adapalene, tazarotene, fluocinolone acetonide, hydroquinone, fluocinolone and alcohol containing products.

11. The method of claim 1, wherein the computing device comprises a mobile device, a tablet, a handheld device, and a desktop device.

12. The method of claim 1, further comprising the step of:
f. collecting information on the frequency the user experiences the issues of step a).

13. The method of claim 1, further comprising the step of:
g. collecting information as to which issues experienced in step a) are troublesome for the user.

14. The method of claim 1, further comprising the step of:
h. collecting information on the degree a user experiences the issues of step a).

15. The method of claim 1, further comprising the step of:
i. collecting information as to which issues experienced in step a) are a priority for the user to address.

16. The method of claim 1, wherein the product selected comprises a regimen of two or more products.

* * * * *